US010503415B2

(12) United States Patent
Chen et al.

(10) Patent No.: US 10,503,415 B2
(45) Date of Patent: Dec. 10, 2019

(54) SNAPSHOT PROCESSING METHOD AND RELATED DEVICE

(71) Applicant: Huawei Technologies Co., Ltd., Shenzhen (CN)

(72) Inventors: Lei Chen, Chengdu (CN); Xiaohua Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 15/498,832

(22) Filed: Apr. 27, 2017

(65) Prior Publication Data

US 2017/0228181 A1 Aug. 10, 2017

Related U.S. Application Data

(63) Continuation of application No. PCT/CN2015/098112, filed on Dec. 21, 2015.

(30) Foreign Application Priority Data

Dec. 31, 2014 (CN) .......................... 2014 1 0854105

(51) Int. Cl.
*G06F 11/14* (2006.01)
*G06F 3/06* (2006.01)

(52) U.S. Cl.
CPC ............ *G06F 3/0619* (2013.01); *G06F 3/065* (2013.01); *G06F 3/0659* (2013.01); *G06F 3/0665* (2013.01); *G06F 3/0689* (2013.01); *G06F 11/14* (2013.01); *G06F 11/1446* (2013.01)

(58) Field of Classification Search
None
See application file for complete search history.

(56) References Cited

U.S. PATENT DOCUMENTS

| 7,356,574 | B2 | 4/2008 | Demmon |
| 9,881,014 | B1* | 1/2018 | Bono ................ G06F 17/30575 |
| 2004/0167972 | A1 | 8/2004 | Demmon |
| 2004/0236983 | A1 | 11/2004 | Burton et al. |

(Continued)

FOREIGN PATENT DOCUMENTS

| CN | 101562761 A | 10/2009 |
| CN | 102053876 A | 5/2011 |

(Continued)

*Primary Examiner* — Kaushikkumar M Patel
(74) *Attorney, Agent, or Firm* — Slater Matsil, LLP

(57) ABSTRACT

A snapshot processing method includes: receiving a snapshot request command, where the snapshot request command includes an ID of a primary LUN; determining the primary LUN according to the ID of the primary LUN, and setting a snapshot status of the primary LUN to a preparation state; sending a first snapshot command to a mirror storage device, where the first snapshot command includes the ID of the primary LUN, and the first snapshot command is used to notify the mirror storage device that the primary LUN is in the preparation state; receiving a response message, sent by the mirror storage device, of the first snapshot command, where the response message is used to notify the primary storage device that a mirrored LUN is in the preparation state; and performing snapshot processing on the primary LUN.

22 Claims, 4 Drawing Sheets

(56) References Cited

U.S. PATENT DOCUMENTS

| | | | | |
|---|---|---|---|---|
| 2005/0210320 A1* | 9/2005 | Vincent | ............... | G06F 11/2071 714/11 |
| 2006/0020762 A1* | 1/2006 | Urmston | ............. | G06F 11/1451 711/162 |
| 2007/0266212 A1 | 11/2007 | Uchikado et al. | | |
| 2009/0193206 A1 | 7/2009 | Ishii et al. | | |
| 2011/0099148 A1* | 4/2011 | Bruning, III | ........ | G06F 11/1004 707/639 |
| 2012/0079224 A1* | 3/2012 | Clayton | ............. | G06F 11/1456 711/162 |
| 2012/0254114 A1* | 10/2012 | Gundy | ............... | G06F 17/30088 707/639 |
| 2012/0254124 A1* | 10/2012 | Gundy | ............... | G06F 11/2074 707/659 |
| 2013/0024626 A1* | 1/2013 | Benhase | ............. | G06F 12/0862 711/137 |
| 2013/0173538 A1* | 7/2013 | Wilkinson | ........ | G06F 17/30584 707/611 |
| 2013/0246367 A1* | 9/2013 | Clayton | .............. | G06F 11/2071 707/655 |
| 2014/0108752 A1* | 4/2014 | Brown | ................ | G06F 11/1451 711/162 |
| 2015/0081628 A1* | 3/2015 | Brown | ................ | G06F 11/2056 707/613 |
| 2015/0089509 A1* | 3/2015 | Brown | ................. | G06F 9/5016 718/103 |
| 2015/0134617 A1* | 5/2015 | Bloom | ................ | G06F 11/1448 707/649 |
| 2015/0310080 A1* | 10/2015 | Jaquette | ................. | G06F 16/11 707/639 |
| 2015/0378832 A1* | 12/2015 | Brown | ................ | G06F 11/1451 714/19 |

FOREIGN PATENT DOCUMENTS

| | | |
|---|---|---|
| CN | 103843309 A | 6/2014 |
| JP | 2007286860 A | 11/2007 |
| JP | 2009181206 A | 8/2009 |
| WO | 2010002408 A1 | 1/2010 |

* cited by examiner

SNAPSHOT PROCESSING METHOD AND RELATED DEVICE

CROSS-REFERENCE TO RELATED APPLICATIONS

This application is a continuation of International Application No. PCT/CN2015/098112, filed on Dec. 21, 2015, which claims priority to Chinese Patent Application No. 201410854105.3, filed on Dec. 31, 2014. The disclosures of the aforementioned applications are hereby incorporated by reference in their entireties.

TECHNICAL FIELD

The present invention relates to the field of electronic technologies, and in particular, to a snapshot processing method and a related device.

BACKGROUND

As information technologies develop continuously, more data needs to be stored and processed. During construction of a data center, increasingly strict requirements on reliability and disaster recovery need to be met, and resource utilization also needs to be improved. Therefore, an active-active data center solution emerges. Same hosts and storage systems established at two locations are interconnected by using a dedicated network. Upper-layer applications and servers form a two-location cluster, and a two-location cluster is also formed in terms of storage, so as to implement fail-over and load balancing of multiple layers: application, network, and storage, and use less investment to implement zero data loss with close-to-zero service interruption time.

An active-active data center has data volumes mirroring each other at two locations. The data volumes present a same identifier and attribute to the upper-layer applications and servers, and may be considered as an "active-active mirror volume" that is logically a whole but whose two pieces of mirror data are separately at the two locations. A snapshot may be understood as a copy of a data set, and the copy includes an image of corresponding data at a particular time point (a start time point of copying), or the snapshot may be understood as a duplicate of a data set at a time point. An active-active snapshot is a snapshot of the active-active mirror volume, and is actually snapshots of a pair of mirrors forming in the active-active mirror volume. Data in the snapshots is completely the same, so that the active-active mirror volume may roll back to a state of a time point (for example, a snapshot rollback of the active-active mirror volume means that data at the two locations needs to roll back to a same state). Because data of the active-active mirror volume at the two locations is concurrent and the data changes at any time, snapshots finally taken at the two locations may be inconsistent without a good cooperation mechanism.

In prior-art solutions, input/output (I/O) interfaces of multiple sites are usually simultaneously blocked or suspended, and when there is no new change in data, snapshots are taken together. However, most active-active snapshots are in a long-distance and cross-site scenario, I/O interfaces at two locations are concurrent, and each write request needs to be synchronized to a remote end. Therefore, during a large amount of concurrent data, two sites wait each other and suspend I/O interfaces, and completing taking snapshots needs a relatively long latency. Consequently, an upper application service is affected, even a pause occurs or temporarily no response is received, and a snapshot rate is low.

SUMMARY

An embodiment of the present invention provides a snapshot processing method and a related device. In a snapshot process, an I/O interface does not need to be blocked or suspended, so that data consistency between a primary storage device and a mirror storage device is ensured, and a rate of a snapshot operation is improved.

A first aspect of an embodiment of the present invention provides a snapshot processing method, where the method is applied to a storage system. The storage system includes a primary storage device and a mirror storage device. Both the primary storage device and the mirror storage device are in an operating mode. The primary storage device includes a primary logical unit (LUN), and the mirror storage device includes a mirrored LUN of the primary LUN. The method is executed by the primary storage device, and includes: receiving a snapshot request command, where the snapshot request command includes an ID (Identity) of the primary LUN. The method also includes determining the primary LUN according to the ID of the primary LUN, and setting a snapshot status of the primary LUN to a preparation state, where the preparation state indicates that the primary storage device enters a preparation phase of performing snapshot processing on the primary LUN. The method also includes sending a first snapshot command to the mirror storage device, where the first snapshot command includes the ID of the primary LUN, and the first snapshot command is used to notify the mirror storage device that the primary LUN is in the preparation state. The method also includes receiving a response message, sent by the mirror storage device, of the first snapshot command, where the response message is used to notify the primary storage device that the mirrored LUN is in the preparation state; and performing snapshot processing on the primary LUN.

In a first possible implementation manner of the first aspect, after the setting a snapshot status of the primary LUN to a preparation state, the method further includes: receiving a data write request sent by a host, where the data write request includes service data and the ID of the primary LUN; and after determining, according to the ID of the primary LUN, that the primary LUN is in the preparation state, writing the service data to the primary LUN; and forwarding the data write request to the mirror storage device.

In a second possible implementation manner of the first aspect, after the setting a snapshot status of the primary LUN to a preparation state, the method further includes: receiving a data write request sent by the mirror storage device, where the data write request includes service data and the ID of the primary LUN; and after determining, according to the ID of the primary LUN, that the primary LUN is in the preparation state, writing the service data to the primary LUN.

In a third possible implementation manner of the first aspect, after the performing snapshot processing on the primary LUN, the method further includes: setting the snapshot status of the primary LUN to a complete state, where the complete state is used to indicate that the primary storage device has completed snapshot processing on the primary LUN; sending a second snapshot command to the mirror storage device, where the second snapshot command includes the ID of the primary LUN, and a snapshot complete command is used to notify the mirror storage device that the primary LUN is in the complete state; and receiving a response message, sent by the mirror storage device, of the second snapshot command, where the response message is used to notify the primary storage device that the mirror storage device has completed snapshot processing on the mirrored LUN.

A second aspect of an embodiment of the present invention provides a snapshot processing method, where the method is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The method is executed by the mirror storage device, and includes: receiving a first snapshot command sent by the primary storage device, where the first snapshot command includes an ID of the primary LUN, and the first snapshot command is used to notify the mirror storage device that the primary storage device has completed snapshot processing on the primary LUN. The method also includes performing snapshot processing on the mirrored LUN, where an ID of the mirrored LUN and the ID of the primary LUN are the same.

In a first possible implementation manner of the second aspect, before the receiving a first snapshot command sent by the primary storage device, the method further includes: receiving a second snapshot command sent by the primary storage device, where the second snapshot command includes the ID of the primary LUN, and the second snapshot command is used to notify the mirror storage device that the primary LUN is in a preparation state; determining the mirrored LUN according to the ID of the primary LUN, and setting a snapshot status of the mirrored LUN to the preparation state, where the preparation state indicates that the mirror storage device enters a preparation phase of performing snapshot processing on the mirrored LUN; and sending a response message of the second snapshot command to the primary storage device, where the response message is used to notify the primary storage device that the mirrored LUN is in the preparation state.

In a second possible implementation manner of the second aspect, the method further includes: receiving a data write request sent by the primary storage device, where the data write request includes service data and the ID of the primary LUN; and writing the service data to the mirrored LUN.

In a third possible implementation manner of the second aspect, the method further includes: receiving a data write request sent by a host, where the data write request includes service data and the ID of the mirrored LUN; forwarding the data write request to the primary storage device; and after receiving a message indicating that the primary storage device writes the service data to the primary LUN, writing the service data to the mirrored LUN.

A third aspect of an embodiment of the present invention provides a snapshot processing apparatus, where the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The apparatus is the primary storage device, and includes: a command receiving module, configured to receive a snapshot request command, where the snapshot request command includes an ID of the primary LUN. The apparatus also includes a status setting module, configured to: determine the primary LUN according to the ID of the primary LUN, and set a snapshot status of the primary LUN to a preparation state, where the preparation state indicates that the primary storage device enters a preparation phase of performing snapshot processing on the primary LUN. The apparatus also includes a command sending module, configured to send a first snapshot command to the mirror storage device, where the first snapshot command includes the ID of the primary LUN, and the first snapshot command is used to notify the mirror storage device that the primary LUN is in the preparation state. The apparatus also includes a message receiving module, configured to receive a response message, sent by the mirror storage device, of the first snapshot command, where the response message is used to notify the primary storage device that the mirrored LUN is in the preparation state. The apparatus also includes a snapshot processing module, configured to perform snapshot processing on the primary LUN.

In a first possible implementation manner of the third aspect, the apparatus further includes: a first data receiving module, configured to receive a data write request sent by a host, where the data write request includes service data and the ID of the primary LUN; and a first data write module, configured to: after determining, according to the ID of the primary LUN, that the primary LUN is in the preparation state, write the service data to the primary LUN; and forward the data write request to the mirror storage device.

In a second possible implementation manner of the third aspect, the apparatus further includes: a second data receiving module, configured to receive a data write request sent by the mirror storage device, where the data write request includes service data and the ID of the primary LUN; and a second data write module, configured to: after determining, according to the ID of the primary LUN, that the primary LUN is in the preparation state, write the service data to the primary LUN.

In a third possible implementation manner of the third aspect, the status setting module is further configured to set the snapshot status of the primary LUN to a complete state, where the complete state is used to indicate that the primary storage device has completed snapshot processing on the primary LUN; the command sending module is further configured to send a second snapshot command to the mirror storage device, where the second snapshot command includes the ID of the primary LUN, and a snapshot complete command is used to notify the mirror storage device that the primary LUN is in the complete state; and the message receiving module is further configured to receive a response message, sent by the mirror storage device, of the second snapshot command, where the response message is used to notify the primary storage device that the mirror storage device has completed snapshot processing on the mirrored LUN.

A fourth aspect of an embodiment of the present invention provides a snapshot processing apparatus, where the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The apparatus is the mirror storage device, and includes: a first command receiving module, configured to receive a first snapshot command sent by the primary storage device, where the first snapshot command includes an ID of the primary LUN, and the first snapshot command is used to notify the mirror storage device that the primary storage device has completed snapshot processing on the primary LUN. The apparatus also includes snapshot processing module, configured to perform snapshot processing on the mirrored LUN, where an ID of the mirrored LUN and the ID of the primary LUN are the same.

In a first possible implementation manner of the fourth aspect, the apparatus further includes: a second command receiving module, configured to receive a second snapshot command sent by the primary storage device, where the second snapshot command includes the ID of the primary LUN, and the second snapshot command is used to notify the mirror storage device that the primary LUN is in a preparation state; a status setting module, configured to: determine the mirrored LUN according to the ID of the primary LUN, and set a snapshot status of the mirrored LUN to the preparation state, where the preparation state indicates that the mirror storage device enters a preparation phase of performing snapshot processing on the mirrored LUN; and a message sending module, configured to send a response message of the second snapshot command to the primary storage device, where the response message is used to notify the primary storage device that the mirrored LUN is in the preparation state.

In a second possible implementation manner of the fourth aspect, the apparatus further includes: a first data receiving module, configured to receive a data write request sent by the primary storage device, where the data write request includes service data and the ID of the primary LUN; and a first data write module, configured to write the service data to the mirrored LUN.

In a third possible implementation manner of the fourth aspect, the apparatus further includes: a second data receiving module, configured to receive a data write request sent by a host, where the data write request includes service data and the ID of the primary LUN; a data request forwarding module, configured to forward the data write request to the primary storage device; and a second data write module, configured to: after receiving a message indicating that the primary storage device writes the service data to the primary LUN, write the service data to the mirrored LUN.

During implementation of embodiments of the present invention, first, a snapshot request command is received, the snapshot request command includes an ID of a LUN, the primary LUN is determined according to the ID of the primary LUN, a snapshot status of the primary LUN is set to a preparation state, and the preparation state indicates that a primary storage device enters a preparation phase of performing snapshot processing on the primary LUN. Second, a first snapshot command is sent to a mirror storage device, the first snapshot command includes the ID of the primary LUN, and the first snapshot command is used to notify the mirror storage device that the primary LUN is in the preparation state. Third, a response message, sent by the mirror storage device, of the first snapshot command is received, and the response message is used to notify the primary storage device that a mirrored LUN is in the preparation state. Finally, snapshot processing is performed on the primary LUN. Therefore, in a snapshot process, an I/O interface does not need to be blocked or suspended, data consistency between a primary storage device and a mirror storage device is ensured, and a rate of a snapshot operation is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
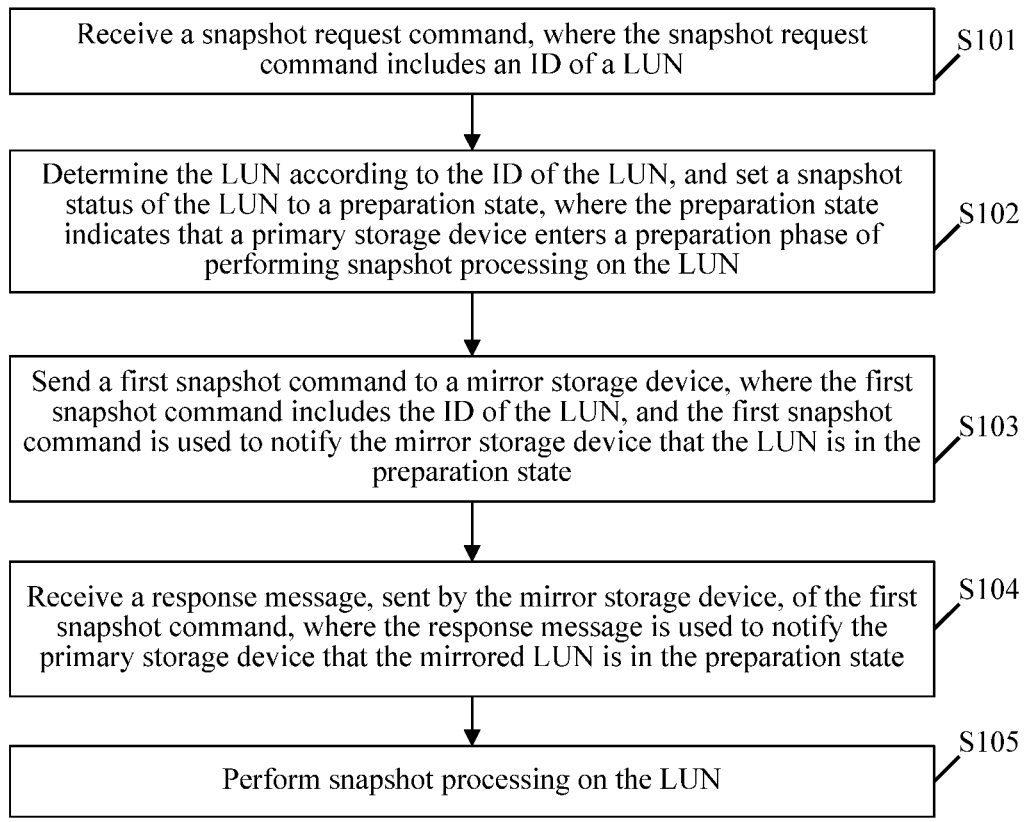
FIG. 1 is a flowchart of a first embodiment of a snapshot processing method.

Referring to FIG. 1, FIG. 1 is a flowchart of a first embodiment of a snapshot processing method.

As shown in the figure, the method is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The primary storage device and the mirror storage device are two sites at different locations, and both the primary storage device and the mirror storage device in the operating mode can receive a data write request sent by a host. The logical unit LUN is logical storage space. The method is executed by the primary storage device, and includes the following steps.

S101: Receive a snapshot request command, where the snapshot request command includes an ID of the primary LUN. The snapshot request command is sent by a snapshot management module in the primary storage device.

S102: Determine the primary LUN according to the ID of the primary LUN, and set a snapshot status of the primary LUN to a preparation state, where the preparation state indicates that the primary storage device enters a preparation phase of performing snapshot processing on the primary LUN.

During specific implementation, after setting the snapshot status of the primary LUN to the preparation state, the primary storage device may receive a data write request sent by the host, where the data write request includes service data and the ID of the primary LUN; and after determining, according to the ID of the primary LUN, that the primary LUN is in the preparation state, write the service data to the primary LUN; and forward the data write request to the mirror storage device.

Optionally, after setting the snapshot status of the primary LUN to the preparation state, the primary storage device may receive a data write request sent by the mirror storage device, where the data write request includes service data and the ID of the primary LUN; and after determining, according to the ID of the primary LUN, that the primary LUN is in the preparation state, write the service data to the primary LUN.

S103: Send a first snapshot command to the mirror storage device, where the first snapshot command includes the ID of the primary LUN, and the first snapshot command is used to notify the mirror storage device that the primary LUN is in the preparation state. The first snapshot command may carry the service data.

During specific implementation, after the mirror storage device receives the first snapshot command, the mirror storage device first determines the mirrored LUN according to the ID of the primary LUN, and sets a snapshot status of the mirrored LUN to the preparation state, where the preparation state indicates that the mirror storage device enters a preparation phase of performing snapshot processing on the mirrored LUN; and then sends a response message of the first snapshot command to the primary storage device. The response message is used to notify the primary storage device that the mirrored LUN is in the preparation state. After the mirrored LUN of the mirror storage device enters the preparation state, the mirror storage device may write the service data carried in the first snapshot command to the mirrored LUN.

S104: Receive a response message, sent by the mirror storage device, of the first snapshot command, where the response message is used to notify the primary storage device that the mirrored LUN is in the preparation state.

S105: Perform snapshot processing on the primary LUN.

During specific implementation, after performing snapshot processing on the primary LUN, the primary storage device first sets the snapshot status of the primary LUN to a complete state, where the complete state is used to indicate that the primary storage device has completed snapshot processing on the primary LUN; and then sends a second snapshot command to the mirror storage device. The second snapshot command includes the ID of the primary LUN, a snapshot complete command is used to notify the mirror storage device that the primary LUN is in the complete state, and the second snapshot command may also carry service data. After the mirror storage device receives the second snapshot command, the mirror storage device may also write the service data carried in the second snapshot command to the mirrored LUN, and after performing snapshot processing on the mirrored LUN, send, to the primary storage device, a response message indicating that the mirror storage device has completed snapshot processing on the mirrored LUN. Finally, the primary storage device receives the response message, sent by the mirror storage device, of the second snapshot command, and the response message is used to notify the primary storage device that the mirror storage device has completed snapshot processing on the mirrored LUN.

In this embodiment of the present invention, first, a snapshot request command is received, the snapshot request command includes an ID of a LUN, the primary LUN is determined according to the ID of the primary LUN, a snapshot status of the primary LUN is set to a preparation state, and the preparation state indicates that a primary storage device enters a preparation phase of performing snapshot processing on the primary LUN. Second, a first snapshot command is sent to a mirror storage device, the first snapshot command includes the ID of the primary LUN, and the first snapshot command is used to notify the mirror storage device that the primary LUN is in the preparation state. Third, a response message, sent by the mirror storage device, of the first snapshot command is received, and the response message is used to notify the primary storage device that a mirrored LUN is in the preparation state. Finally, snapshot processing is performed on the primary LUN. Therefore, in a snapshot process, an I/O interface does not need to be blocked or suspended, data consistency between a primary storage device and a mirror storage device is ensured, and a rate of a snapshot operation is improved.

Figure 2:
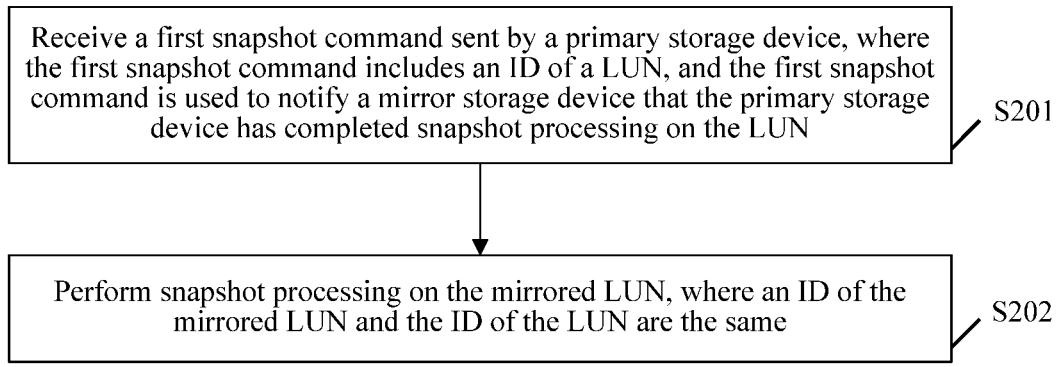
FIG. 2 is a flowchart of a second embodiment of a snapshot processing method.

Referring to FIG. 2, FIG. 2 is a flowchart of a second embodiment of a snapshot processing method.

As shown in the figure, the method is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The primary storage device and the mirror storage device are two sites at different locations, and both the primary storage device and the mirror storage device in the operating mode can receive a data write request sent by a host. The logical unit LUN is logical storage space. The method is executed by the mirror storage device, and includes the following steps.

S201: Receive a first snapshot command sent by the primary storage device, where the first snapshot command includes an ID of the primary LUN, and the first snapshot command is used to notify the mirror storage device that the primary storage device has completed snapshot processing on the primary LUN.

First, before receiving the first snapshot command sent by the primary storage device, the mirror storage device may receive a second snapshot command sent by the primary storage device. The second snapshot command includes the ID of the primary LUN, and the second snapshot command is used to notify the mirror storage device that the primary LUN is in a preparation state. The mirror storage device determines the mirrored LUN according to the ID of the primary LUN, and sets a snapshot status of the mirrored LUN to the preparation state. The preparation state indicates that the mirror storage device enters a preparation phase of performing snapshot processing on the mirrored LUN. The mirror storage device sends a response message of the second snapshot command to the primary storage device. The response message is used to notify the primary storage device that the mirrored LUN is in the preparation state.

Second, after setting the snapshot status of the mirrored LUN to the preparation state, the mirror storage device may first receive a data write request sent by the host, where the data write request includes service data and the ID of the mirrored LUN; and then forward the data write request to the primary storage device. After the primary storage device receives the data write request sent by the mirror storage device and determines, according to the ID of the primary LUN, that the primary LUN is in the preparation state, the primary storage device writes the service data to the primary LUN, and sends, to the mirror storage device, a message indicating that the primary storage device writes the service data to the primary LUN. After receiving the message indicating that the primary storage device writes the service data to the primary LUN, the mirror storage device writes the service data to the mirrored LUN.

Alternatively, after the primary storage device performs snapshot processing on the primary LUN, the primary storage device first sets the snapshot status of the primary LUN to a complete state, where the complete state is used to indicate that the primary storage device has completed snapshot processing on the primary LUN; and then sends the first snapshot command to the mirror storage device. After receiving the first snapshot command, the mirror storage device writes the service data to the mirrored LUN.

Optionally, after setting the snapshot status of the primary LUN to the preparation state, the primary storage device may first receive a data write request sent by the host, and the data write request includes service data and the ID of the primary LUN. Then, after determining, according to the ID of the primary LUN, that the primary LUN is in the preparation state, the primary storage device writes the service data to the primary LUN, and forwards the data write request to the mirror storage device. The mirror storage device first receives the data write request sent by the primary storage device, where the data write request includes the service data and the ID of the primary LUN, and then writes the service data to the mirrored LUN.

Alternatively, after the primary storage device performs snapshot processing on the primary LUN, the primary storage device first sets the snapshot status of the primary LUN to a complete state, where the complete state is used to indicate that the primary storage device has completed snapshot processing on the primary LUN; and then sends the first snapshot command to the mirror storage device. After receiving the first snapshot command, the mirror storage device writes the service data to the mirrored LUN.

S202: Perform snapshot processing on the mirrored LUN, where an ID of the mirrored LUN and the ID of the primary LUN are the same.

In this embodiment of the present invention, first, a first snapshot command sent by a primary storage device is received, the first snapshot command includes an ID of a LUN, and the first snapshot command is used to notify a mirror storage device that the primary storage device has completed snapshot processing on the primary LUN. Then, snapshot processing is performed on a mirrored LUN, and an ID of the mirrored LUN and the ID of the primary LUN are the same. Therefore, in a snapshot process, an I/O interface does not need to be blocked or suspended, data consistency between a primary storage device and a mirror storage device is ensured, and a rate of a snapshot operation is improved.

Figure 3:
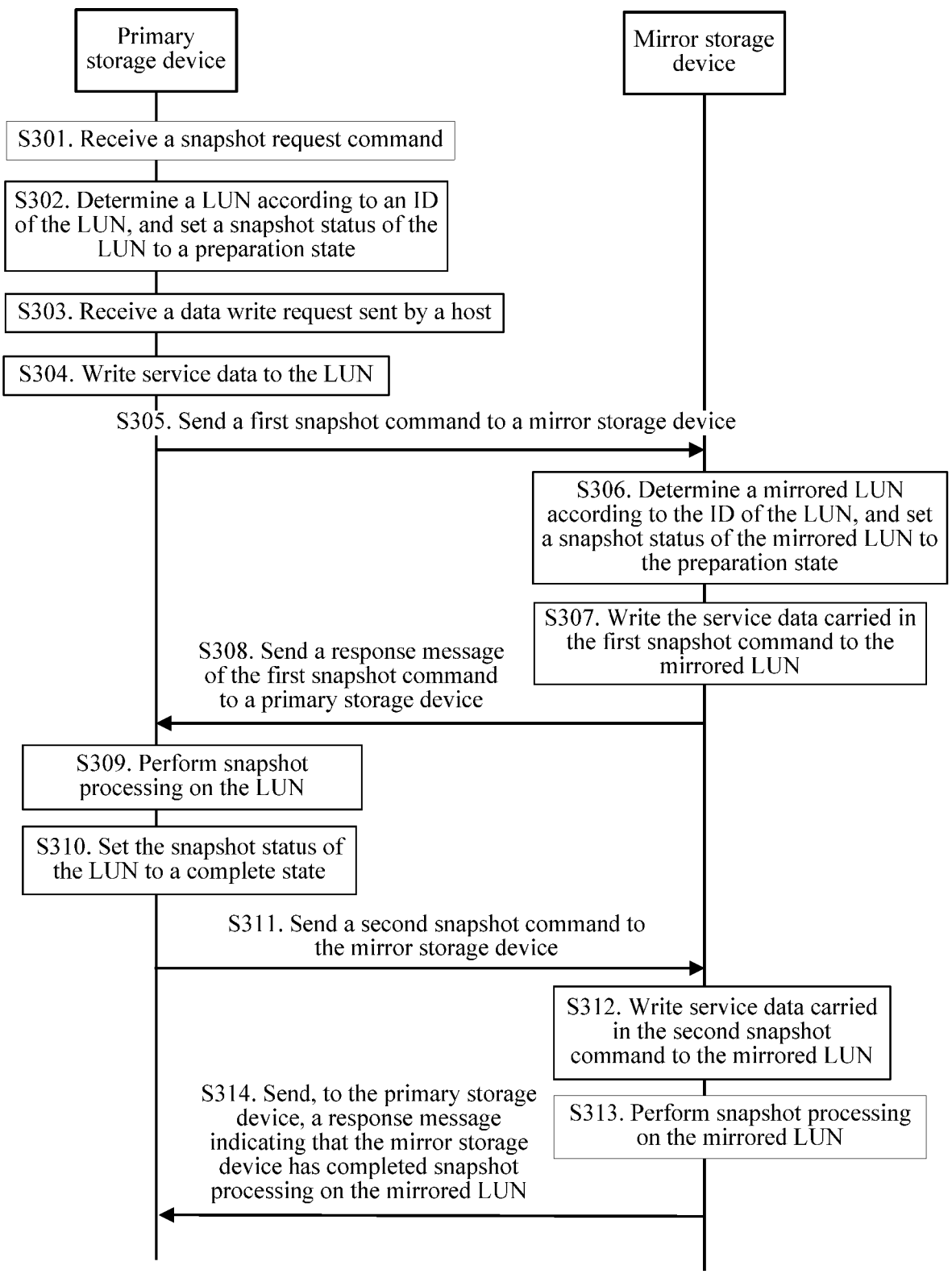
FIG. 3 is a flowchart of a third embodiment of a snapshot processing method.

Referring to FIG. 3, FIG. 3 is a flowchart of a third embodiment of a snapshot processing method. As shown in the figure, the method is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The primary storage device and the mirror storage device are two sites at different locations, and both the primary storage device and the mirror storage device in the operating mode can receive a data write request sent by a host. The logical unit LUN is logical storage space. The method includes the following steps.

S301: The primary storage device receives a snapshot request command, where the snapshot request command includes an ID of the primary LUN. The snapshot request command is sent by a snapshot management module in the primary storage device.

S302: The primary storage device determines the primary LUN according to the ID of the primary LUN, and sets a snapshot status of the primary LUN to a preparation state, where the preparation state indicates that the primary storage device enters a preparation phase of performing snapshot processing on the primary LUN.

S303: The primary storage device receives a data write request sent by the host, where the data write request includes service data and the ID of the primary LUN.

S304: After determining, according to the ID of the primary LUN, that the primary LUN is in the preparation state, the primary storage device writes the service data to the primary LUN.

S305: The primary storage device sends a first snapshot command to the mirror storage device, where the first snapshot command includes the ID of the primary LUN, and the first snapshot command is used to notify the mirror storage device that the primary LUN is in the preparation state. The first snapshot command may carry the service data.

S306: The mirror storage device determines the mirrored LUN according to the ID of the primary LUN, and sets a snapshot status of the mirrored LUN to the preparation state, where the preparation state indicates that the mirror storage device enters a preparation phase of performing snapshot processing on the mirrored LUN.

S307: The mirror storage device writes the service data carried in the first snapshot command to the mirrored LUN.

S308: The mirror storage device sends a response message of the first snapshot command to the primary storage device, where the response message is used to notify the primary storage device that the mirrored LUN is in the preparation state.

S309: The primary storage device performs snapshot processing on the primary LUN.

S310: The primary storage device sets the snapshot status of the primary LUN to a complete state, where the complete state is used to indicate that the primary storage device has completed snapshot processing on the primary LUN.

S311: The primary storage device sends a second snapshot command to the mirror storage device, where the second snapshot command includes the ID of the primary LUN, a snapshot complete command is used to notify the mirror storage device that the primary LUN is in the complete state, and the second snapshot command may also carry service data.

S312: The mirror storage device writes the service data carried in the second snapshot command to the mirrored LUN.

S313: The mirror storage device performs snapshot processing on the mirrored LUN, where an ID of the mirrored LUN and the ID of the primary LUN are the same.

S314: The mirror storage device sends, to the primary storage device, a response message indicating that the mirror storage device has completed snapshot processing on the mirrored LUN. The response message is used to notify the primary storage device that the mirror storage device has completed snapshot processing on the mirrored LUN.

In this embodiment of the present invention, first, a snapshot request command is received, the snapshot request command includes an ID of a LUN, the primary LUN is determined according to the ID of the primary LUN, a snapshot status of the primary LUN is set to a preparation state, and the preparation state indicates that a primary storage device enters a preparation phase of performing snapshot processing on the primary LUN. Second, a first snapshot command is sent to a mirror storage device, the first snapshot command includes the ID of the primary LUN, and the first snapshot command is used to notify the mirror storage device that the primary LUN is in the preparation state. Third, a response message, sent by the mirror storage device, of the first snapshot command is received, and the response message is used to notify the primary storage device that a mirrored LUN is in the preparation state. Finally, snapshot processing is performed on the primary LUN. Therefore, in a snapshot process, an I/O interface does not need to be blocked or suspended, data consistency between a primary storage device and a mirror storage device is ensured, and a rate of a snapshot operation is improved.

Figure 4:
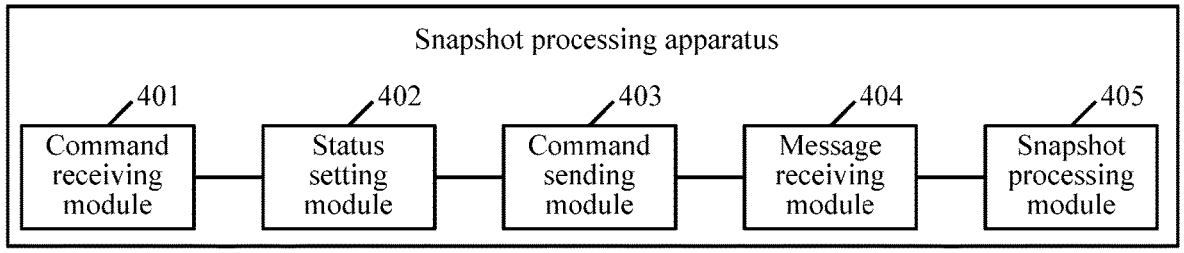
FIG. 4 is a schematic structural diagram of a first embodiment of a snapshot processing apparatus.

Referring to FIG. 4, FIG. 4 is a schematic structural diagram of a first embodiment of a snapshot processing apparatus. As shown in the figure, the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The primary storage device and the mirror storage device are two sites at different locations, and both the primary storage device and the mirror storage device in the operating mode can receive a data write request sent by a host. The logical unit LUN is logical storage space. The apparatus is the primary storage device, and includes: a command receiving module 401, a status setting module 402, a command sending module 403, a message receiving module 404, and a snapshot processing module 405.

The command receiving module 401 is configured to receive a snapshot request command. The snapshot request command includes an ID of the primary LUN. The snapshot request command is sent by a snapshot management module in the primary storage device.

The status setting module 402 is configured to: determine the primary LUN according to the ID of the primary LUN, and set a snapshot status of the primary LUN to a preparation state. The preparation state indicates that the primary storage device enters a preparation phase of performing snapshot processing on the primary LUN.

During specific implementation, the snapshot processing apparatus may further include: a first data receiving module, configured to receive a data write request sent by the host, where the data write request includes service data and the ID of the primary LUN; and a first data write module, configured to: after determining, according to the ID of the primary LUN, that the primary LUN is in the preparation state, write the service data to the primary LUN; and forward the data write request to the mirror storage device.

Optionally, the snapshot processing apparatus may further include: a second data receiving module, configured to receive a data write request sent by the mirror storage device, where the data write request includes service data and the ID of the primary LUN; and a second data write module, configured to: after determining, according to the ID of the primary LUN, that the primary LUN is in the preparation state, write the service data to the primary LUN.

The command sending module 403 is configured to send a first snapshot command to the mirror storage device. The first snapshot command includes the ID of the primary LUN, and the first snapshot command is used to notify the mirror storage device that the primary LUN is in the preparation state. The first snapshot command may carry the service data.

During specific implementation, after the mirror storage device receives the first snapshot command, the mirror storage device first determines the mirrored LUN according to the ID of the primary LUN, and sets a snapshot status of the mirrored LUN to the preparation state, where the preparation state indicates that the mirror storage device enters a preparation phase of performing snapshot processing on the mirrored LUN; and then sends a response message of the first snapshot command to the primary storage device. The response message is used to notify the primary storage device that the mirrored LUN is in the preparation state. After the mirrored LUN of the mirror storage device enters the preparation state, the mirror storage device may write the service data carried in the first snapshot command to the mirrored LUN.

The message receiving module 404 is configured to receive a response message, sent by the mirror storage device, of the first snapshot command. The response message is used to notify the primary storage device that the mirrored LUN is in the preparation state.

The snapshot processing module 405 is configured to perform snapshot processing on the primary LUN.

During specific implementation, after performing snapshot processing on the primary LUN, the primary storage device first sets the snapshot status of the primary LUN to a complete state, where the complete state is used to indicate that the primary storage device has completed snapshot processing on the primary LUN; and then sends a second snapshot command to the mirror storage device. The second snapshot command includes the ID of the primary LUN, a snapshot complete command is used to notify the mirror storage device that the primary LUN is in the complete state, and the second snapshot command may also carry service data. After the mirror storage device receives the second snapshot command, the mirror storage device may also write the service data carried in the second snapshot command to the mirrored LUN, and after performing snapshot processing on the mirrored LUN, send, to the primary storage device, a response message indicating that the mirror storage device has completed snapshot processing on the mirrored LUN. Finally, the primary storage device receives the response message, sent by the mirror storage device, of the second snapshot command, and the response message is used to notify the primary storage device that the mirror storage device has completed snapshot processing on the mirrored LUN.

In this embodiment of the present invention, first, a snapshot request command is received, the snapshot request command includes an ID of a LUN, the primary LUN is determined according to the ID of the primary LUN, a snapshot status of the primary LUN is set to a preparation state, and the preparation state indicates that a primary storage device enters a preparation phase of performing snapshot processing on the primary LUN. Second, a first snapshot command is sent to a mirror storage device, the first snapshot command includes the ID of the primary LUN, and the first snapshot command is used to notify the mirror storage device that the primary LUN is in the preparation state. Third, a response message, sent by the mirror storage device, of the first snapshot command is received, and the response message is used to notify the primary storage device that a mirrored LUN is in the preparation state. Finally, snapshot processing is performed on the primary LUN. Therefore, in a snapshot process, an I/O interface does not need to be blocked or suspended, data consistency between a primary storage device and a mirror storage device is ensured, and a rate of a snapshot operation is improved.

Figure 5:
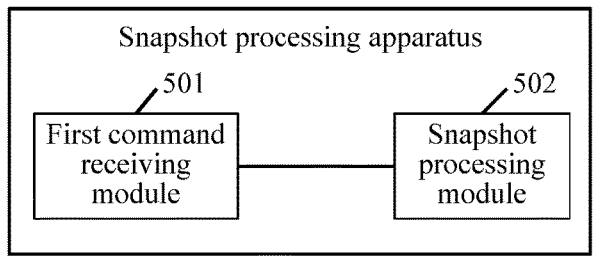
FIG. 5 is a schematic structural diagram of a second embodiment of a snapshot processing apparatus.

Referring to FIG. 5, FIG. 5 is a schematic structural diagram of a second embodiment of a snapshot processing apparatus. As shown in the figure, the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The primary storage device and the mirror storage device are two sites at different locations, and both the primary storage device and the mirror storage device in the operating mode can receive a data write request sent by a host. The logical unit LUN is logical storage space. The apparatus is the mirror storage device, and includes: a first command receiving module 501 and a snapshot processing module 502.

The first command receiving module 501 is configured to receive a first snapshot command sent by the primary storage device. The first snapshot command includes an ID of the primary LUN, and the first snapshot command is used to notify the mirror storage device that the primary storage device has completed snapshot processing on the primary LUN.

During specific implementation, the snapshot processing apparatus may further include: a second command receiving module, configured to: before the first snapshot command sent by the primary storage device is received, receive a second snapshot command sent by the primary storage device, where the second snapshot command includes the ID of the primary LUN, and the second snapshot command is used to notify the mirror storage device that the primary LUN is in a preparation state; a status setting module, configured to: determine the mirrored LUN according to the ID of the primary LUN, and set a snapshot status of the mirrored LUN to the preparation state, where the preparation state indicates that the mirror storage device enters a preparation phase of performing snapshot processing on the mirrored LUN; and a message sending module, configured to send a response message of the second snapshot command to the primary storage device, where the response message is used to notify the primary storage device that the mirrored LUN is in the preparation state.

Optionally, the snapshot processing apparatus may further include a first data receiving module and a first data write module.

The first data receiving module is configured to receive a data write request sent by the primary storage device. The data write request includes service data and the ID of the primary LUN. Specifically, after setting the snapshot status of the primary LUN to the preparation state, the primary storage device may first receive a data write request sent by the host, and the data write request includes the service data and the ID of the primary LUN. Then, after determining, according to the ID of the primary LUN, that the primary LUN is in the preparation state, the primary storage device writes the service data to the primary LUN, and forwards the data write request to the mirror storage device.

The first data write module is configured to write the service data to the mirrored LUN. Specifically, after the data write request sent by the primary storage device is received, the first data write module may write the service data to the mirrored LUN. Alternatively, after the primary storage device performs snapshot processing on the primary LUN, the primary storage device first sets the snapshot status of the primary LUN to a complete state, where the complete state is used to indicate that the primary storage device has completed snapshot processing on the primary LUN; and then sends the first snapshot command to the mirror storage device. After receiving the first snapshot command, the mirror storage device writes the service data to the mirrored LUN.

Optionally, the snapshot processing apparatus may further include: a second data receiving module, configured to receive a data write request sent by the host, where the data write request includes service data and the ID of the primary LUN; a data request forwarding module, configured to forward the data write request to the primary storage device, where specifically, after the primary storage device receives the data write request sent by the mirror storage device and determines, according to the ID of the primary LUN, that the primary LUN is in the preparation state, the primary storage device writes the service data to the primary LUN, and sends, to the mirror storage device, a message indicating that the primary storage device writes the service data to the primary LUN; and a second data write module, configured to: after receiving a message indicating that the primary storage device writes the service data to the primary LUN, write the service data to the mirrored LUN. Alternatively, after the primary storage device performs snapshot processing on the primary LUN, the primary storage device first sets the snapshot status of the primary LUN to a complete state, where the complete state is used to indicate that the primary storage device has completed snapshot processing on the primary LUN; and then sends the first snapshot command to the mirror storage device. After receiving the first snapshot command, the mirror storage device writes the service data to the mirrored LUN.

The snapshot processing module 502 is configured to perform snapshot processing on the mirrored LUN. An ID of the mirrored LUN and the ID of the primary LUN are the same.

In this embodiment of the present invention, first, a first snapshot command sent by a primary storage device is received, the first snapshot command includes an ID of a LUN, and the first snapshot command is used to notify a mirror storage device that the primary storage device has completed snapshot processing on the primary LUN. Then, snapshot processing is performed on a mirrored LUN, and an ID of the mirrored LUN and the ID of the primary LUN are the same. Therefore, in a snapshot process, an I/O interface does not need to be blocked or suspended, data consistency between a primary storage device and a mirror storage device is ensured, and a rate of a snapshot operation is improved.

Figure 6:
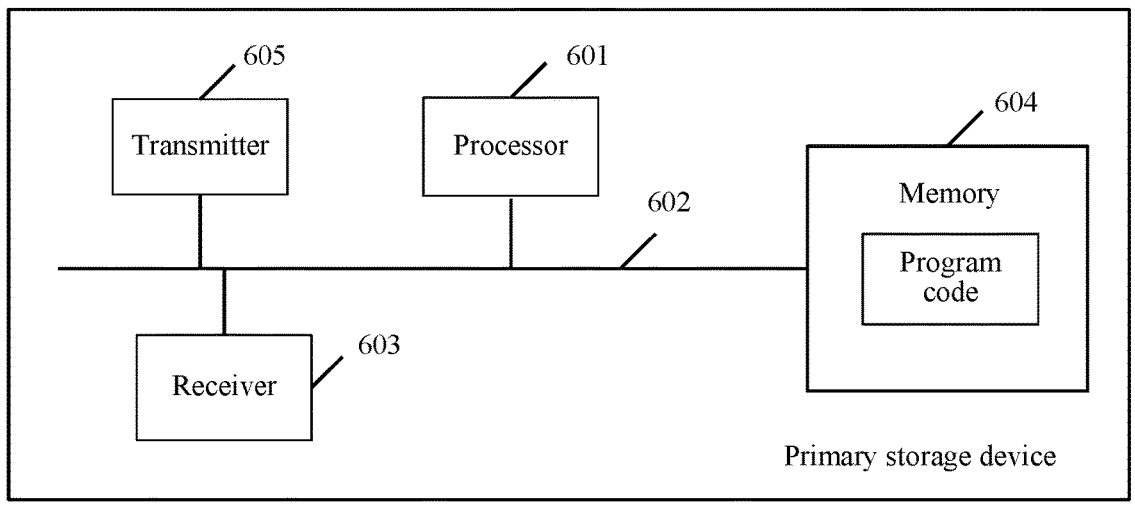
FIG. 6 is a schematic structural diagram of a third embodiment of a snapshot processing apparatus.

Referring to FIG. 6, FIG. 6 is a schematic structural diagram of a third embodiment of a snapshot processing apparatus. As shown in the figure, the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The apparatus is the primary storage device. The apparatus may include: at least one processor 601, for example, a CPU, at least one receiver 603, at least one memory 604, at least one transmitter 605, and at least one communications bus 602. The communications bus 602 is configured to implement connection and communication between the components. The receiver 603 and the transmitter 605 of the apparatus in this embodiment of the present invention may be a wired transmit port, or may be a wireless device, for example, including an antenna apparatus, and are configured to communicate signaling or data with another node device. The memory 604 may be a high-speed RAM memory, or a non-volatile memory (NVM), such as, at least one magnetic disk storage. The memory 604 may be optionally at least one storage apparatus that is located far away from the processor 601. The memory 604 stores a set of program code, and the processor 601 is configured to invoke the program code stored in the memory to execute the following operations: receiving a snapshot request command, where the snapshot request command includes an ID of the primary LUN; determining the primary LUN according to the ID of the primary LUN, and setting a snapshot status of the primary LUN to a preparation state, where the preparation state indicates that the primary storage device enters a preparation phase of performing snapshot processing on the primary LUN; sending a first snapshot command to the mirror storage device, where the first snapshot command includes the ID of the primary LUN, and the first snapshot command is used to notify the mirror storage device that the primary LUN is in the preparation state; receiving a response message, sent by the mirror storage device, of the first snapshot command, where the response message is used to notify the primary storage device that the mirrored LUN is in the preparation state; and performing snapshot processing on the primary LUN.

Optionally, after the setting a snapshot status of the primary LUN to a preparation state, the processor 601 may further execute the following operations: receiving a data write request sent by a host, where the data write request includes service data and the ID of the primary LUN; and after determining, according to the ID of the primary LUN, that the primary LUN is in the preparation state, writing the service data to the primary LUN; and forwarding the data write request to the mirror storage device.

Optionally, after the setting a snapshot status of the primary LUN to a preparation state, the processor 601 may further execute the following operations: receiving a data write request sent by the mirror storage device, where the data write request includes service data and the ID of the primary LUN; and after determining, according to the ID of the primary LUN, that the primary LUN is in the preparation state, writing the service data to the primary LUN.

Optionally, after the performing snapshot processing on the primary LUN, the processor 601 may further execute the following operations: setting the snapshot status of the primary LUN to a complete state, where the complete state is used to indicate that the primary storage device has completed snapshot processing on the primary LUN; sending a second snapshot command to the mirror storage device, where the second snapshot command includes the ID of the primary LUN, and a snapshot complete command is used to notify the mirror storage device that the primary LUN is in the complete state; and receiving a response message, sent by the mirror storage device, of the second snapshot command, where the response message is used to notify the primary storage device that the mirror storage device has completed snapshot processing on the mirrored LUN.

Figure 7:
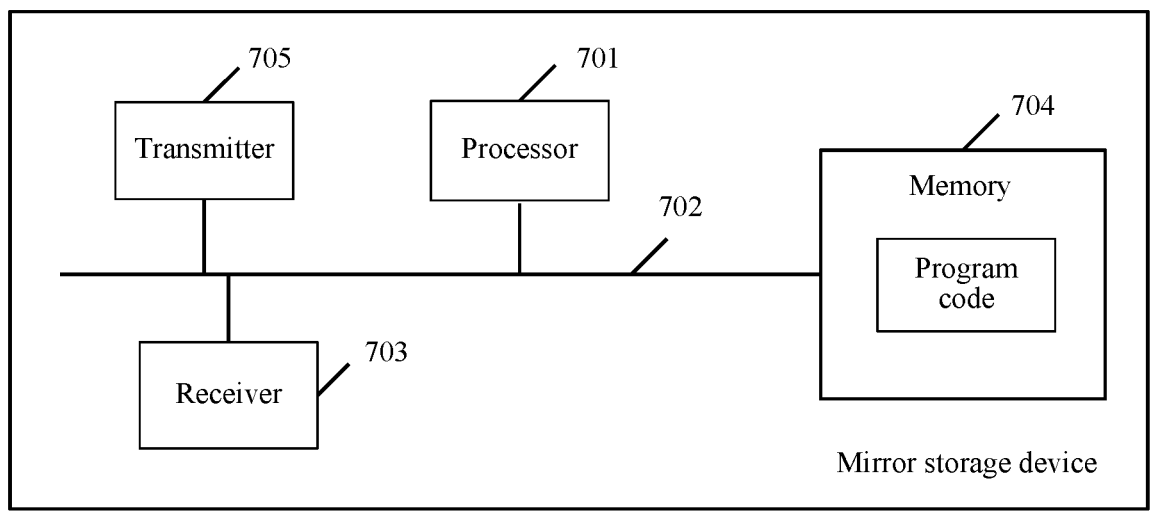
FIG. 7 is a schematic structural diagram of a fourth embodiment of a snapshot processing apparatus.

Referring to FIG. 7, FIG. 7 is a schematic structural diagram of a fourth embodiment of a snapshot processing apparatus. As shown in the figure, the apparatus is applied to a storage system. The storage system includes a primary storage device and a mirror storage device. Both the primary storage device and the mirror storage device are in an operating mode. The primary storage device includes a logical unit LUN, and the mirror storage device includes a mirrored LUN of the primary LUN. The apparatus is the mirror storage device. The apparatus may include: at least one processor 701, for example, a CPU, at least one receiver 703, at least one memory 704, at least one transmitter 705, and at least one communications bus 702. The communications bus 702 is configured to implement connection and communication between the components. The receiver 703 and the transmitter 705 of the apparatus in this embodiment of the present invention may be a wired transmit port, or may be a wireless device, for example, including an antenna apparatus, and are configured to communicate signaling or data with another node device. The memory 704 may be a high-speed RAM memory, or a non-volatile memory, such as, at least one magnetic disk storage. The memory 704 may be optionally at least one storage apparatus that is located far away from the processor 701. The memory 704 stores a set of program code, and the processor 701 is configured to invoke the program code stored in the memory to execute the following operations: receiving a first snapshot command sent by the primary storage device, where the first snapshot command includes an ID of the primary LUN, and the first snapshot command is used to notify the mirror storage device that the primary storage device has completed snapshot processing on the primary LUN; and performing snapshot processing on the mirrored LUN, where an ID of the mirrored LUN and the ID of the primary LUN are the same.

Optionally, before the receiving a first snapshot command sent by the primary storage device, the processor 701 may further execute the following operations: receiving a second snapshot command sent by the primary storage device, where the second snapshot command includes the ID of the primary LUN, and the second snapshot command is used to notify the mirror storage device that the primary LUN is in a preparation state; determining the mirrored LUN according to the ID of the primary LUN, and setting a snapshot status of the mirrored LUN to the preparation state, where the preparation state indicates that the mirror storage device enters a preparation phase of performing snapshot processing on the mirrored LUN; and sending a response message of the second snapshot command to the primary storage device, where the response message is used to notify the primary storage device that the mirrored LUN is in the preparation state.

Optionally, the processor 701 may further execute the following operations: receiving a data write request sent by the primary storage device, where the data write request includes service data and the ID of the primary LUN; and writing the service data to the mirrored LUN.

Optionally, the processor 701 may further execute the following operations: receiving a data write request sent by a host, where the data write request includes service data and the ID of the mirrored LUN; forwarding the data write request to the primary storage device; and after receiving a message indicating that the primary storage device writes the service data to the primary LUN, writing the service data to the mirrored LUN.

It should be noted that, for brief description, the foregoing method embodiments are represented as a series of actions. However, a person skilled in the art should appreciate that the present invention is not limited to the described order of the actions, because according to embodiments of the present invention, some steps may be performed in other orders or simultaneously. In addition, a person skilled in the art should also appreciate that all the embodiments described in the specification are examples of embodiments, and the related actions and modules are not necessarily mandatory to embodiments of the present invention.

In the foregoing embodiments, the description of each embodiment has respective focuses. For a part that is not described in detail in an embodiment, reference may be made to related descriptions in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The snapshot processing method and related device provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A method, comprising:
receiving, by a primary storage device, a snapshot request command, wherein the snapshot request command comprises an ID of a primary logical unit (LUN), wherein the primary storage device is comprised in a storage system, the storage system further includes a mirror storage device, both the primary storage device and the mirror storage device are in an operating mode, the primary storage device comprises the primary LUN, and the mirror storage device comprises a mirrored LUN of the primary LUN;
determining, by the primary storage device, the primary LUN, according to the ID of the primary LUN, and setting a snapshot status of the primary LUN to a preparation state, wherein the preparation state indicates that the primary storage device enters a preparation phase of performing a snapshot on the primary LUN;
sending, by the primary storage device, a first snapshot command to the mirror storage device, wherein the first snapshot command comprises first service data and the ID of the primary LUN, notifies the mirror storage device that the primary LUN is in the preparation state, and instructs the mirror storage device to write the first service data to the mirror storage device;
after sending the first snapshot command, receiving, by the primary storage device and from the mirror storage device, a first response message notifying the primary storage device that the mirrored LUN is in the preparation state;
performing, by the primary storage device, the snapshot on the primary LUN;
after completing the performing the snapshot on the primary LUN, sending, by the primary storage device to the mirror storage device, a snapshot complete command comprising second service data, the snapshot complete command notifying the mirror storage device that the primary storage device has completed the snapshot on the primary LUN and instructing the mirror storage device to write the second service data to the mirror storage device; and
after the sending the snapshot complete command, receiving, by the primary storage device from the mirror storage device, a second response message indicating that the mirror storage device has completed the snapshot on the mirrored LUN.

2. The method according to claim 1, further comprising:
receiving, from a host after the setting the snapshot status of the primary LUN to the preparation state, a data write request comprising the first service data and the ID of the primary LUN; and
after determining that the primary LUN is in the preparation state:
writing the first service data to the primary LUN; and
forwarding the data write request to the mirror storage device.

3. The method according to claim 1, further comprising:
receiving, from the mirror storage device after the setting the snapshot status of the primary LUN to the preparation state, a data write request comprising new service data and an ID of the mirrored LUN;
after determining that the primary LUN is in the preparation state, writing the new service data to the primary LUN; and
sending, to the mirror storage device, a message indicating that the primary storage device has written the new service data to the primary LUN and instructing the mirror storage device to write the new service data to the mirror storage device.

4. The method according to claim 1, wherein sending the snapshot complete command comprises:
setting the snapshot status of the primary LUN to a complete state, wherein the complete state indicates that the primary storage device has completed snapshotting on the primary LUN; and
sending the snapshot complete command to the mirror storage device comprising the ID of the primary LUN, and notifying the mirror storage device that the primary LUN is in the complete state.

5. A method comprising:
receiving, by a primary storage device, a snapshot request command requesting that a snapshot be performed on a primary logical unit (LUN) of the primary storage device, the primary storage device being in a storage system that includes a mirror storage device, the mirror storage device including a mirrored LUN of the primary LUN;
performing, by the primary storage device, a snapshot on the primary LUN;
sending, by the primary storage device, a snapshot complete command to the mirror storage device after completing the snapshot on the primary LUN, the snapshot complete command instructing the mirror storage device to write first service data to the mirror storage device; and
receiving, by the primary storage device, a response to the snapshot complete command from the mirror storage device, the response indicating that the mirror storage device completed a snapshot on the mirrored LUN after receiving the snapshot complete command.

6. The method of claim 5, wherein the snapshot request command includes an ID of the primary LUN.

7. The method of claim 5, further comprising setting, by the primary storage device, a snapshot status of the primary LUN to a preparation state, the preparation state indicating that the primary storage device is preparing to perform a snapshot on the primary LUN.

8. The method of claim 7, further comprising:
receiving, by the primary storage device, a data write request from the mirror storage device after the setting the snapshot status of the primary LUN to the preparation state, the data write request including an ID of the mirrored LUN and second service data that is different than the first service data; and
writing, by the primary storage device, the second service data to the primary LUN after receiving the data write request from the mirror storage device.

9. The method of claim 8, further comprising:
sending, by the primary storage device, a message to the mirror storage device indicating that the primary storage device has written the second service data to the primary LUN, the message instructing the mirror storage device to write the second service data to the mirror storage device.

10. The method according to claim 5, further comprising:
setting, by the primary storage device, a snapshot status of the primary LUN to a complete state, wherein the complete state indicates that the primary storage device has completed the snapshot on the primary LUN, the snapshot complete command being sent to the mirror storage device after the snapshot status of the primary LUN is set to the complete state.

11. A method comprising:
receiving, by a mirror storage device, a snapshot complete command indicating that a primary storage device has completed a snapshot on a primary logical unit (LUN) of the primary storage device, the mirror storage device including a mirrored LUN of the primary LUN, the snapshot complete command instructing the mirror storage device to write first service data to the mirror storage device;
performing, by the mirror storage device, a snapshot on the mirrored LUN after receiving the snapshot complete command; and
sending, by the mirror storage device, a response to the primary storage device indicating that the mirror storage device completed the snapshot on the mirrored LUN after receiving the snapshot complete command.

12. The method of claim 11, further comprising:
sending, by the mirror storage device, a data write request from the primary storage device, the data write request including an ID of the mirrored LUN and second service data that is different than the first service data, the data write request prompting the primary storage device to write the second service data to the primary LUN; and
receiving, by the mirror storage device, a message from the primary storage device indicating that the primary storage device has written the second service data to the primary LUN, the message instructing the mirror storage device to write the second service data to the mirror storage device.

13. The method of claim 11, further comprising:
receiving, by the mirror storage device, a data write request sent by a host, wherein the data write request comprises new service data and an ID of the mirrored LUN;
forwarding, by the mirror storage device, the data write request to the primary storage device; and
writing, by the mirror storage device, the new service data to the mirrored LUN in response to receiving a message indicating that the primary storage device has written the new service data to the primary LUN.

14. A primary storage device comprising:
a processor; and
a non-transitory computer-readable storage medium storing a program to be executed by the processor, the program including instructions for:
receive a snapshot request command requesting that a snapshot be performed on a primary logical unit (LUN) of the primary storage device, the primary storage device being in a storage system that includes a mirror storage device, the mirror storage device including a mirrored LUN of the primary LUN;
perform a snapshot on the primary LUN;
send a snapshot complete command to the mirror storage device after completing the snapshot on the primary LUN, the snapshot complete command instructing the mirror storage device to write first service data to the mirror storage device; and
receive a response to the snapshot complete command from the mirror storage device, the response indicating that the mirror storage device completed a snapshot on the mirrored LUN after receiving the snapshot complete command.

15. The primary storage device of claim 14, wherein the snapshot request command includes an ID of the primary LUN.

16. The primary storage device of claim 14, wherein the program further includes instructions to set a snapshot status of the primary LUN to a preparation state, the preparation state indicating that the primary storage device is preparing to perform a snapshot on the primary LUN.

17. The primary storage device of claim 16, wherein the program further includes instructions to:
receive a data write request from the mirror storage device after setting the snapshot status of the primary LUN to the preparation state, the data write request including an ID of the mirrored LUN and second service data that is different than the first service data; and
write the second service data to the primary LUN after receiving the data write request from the mirror storage device.

18. The primary storage device of claim 17, wherein the program further includes instructions to:
send a message to the mirror storage device indicating that the primary storage device has written the second service data to the primary LUN, the message instructing the mirror storage device to write the second service data to the mirror storage device.

19. The primary storage device of claim 14, wherein the program further includes instructions to:
set a snapshot status of the primary LUN to a complete state, wherein the complete state indicates that the primary storage device has completed the snapshot on the primary LUN, the snapshot complete command being sent to the mirror storage device after the snapshot status of the primary LUN is set to the complete state.

20. A mirror storage device comprising:
a processor; and
a non-transitory computer-readable storage medium storing a program to be executed by the processor, the program including instructions for:
receive a snapshot complete command indicating that a primary storage device has completed a snapshot on a primary logical unit (LUN) of the primary storage device, the mirror storage device including a mirrored LUN of the primary LUN, the snapshot complete command instructing the mirror storage device to write a first service data to the mirror storage device;

perform a snapshot on the mirrored LUN after receiving the snapshot complete command; and send a response to the primary storage device indicating that the mirror storage device completed the snapshot on the mirrored LUN after receiving the snapshot complete command.

21. The mirror storage device of claim 20, wherein the program further includes instructions to:

send a data write request from the primary storage device, the data write request including an ID of the mirrored LUN and second service data that is different than the first service data, the data write request prompting the primary storage device to write the second service data to the primary LUN; and receive a message from the primary storage device indicating that the primary storage device has written the second service data to the primary LUN, the message instructing the mirror storage device to write the second service data to the mirror storage device.

22. The mirror storage device of claim 20, wherein the program further includes instructions to:

receive a data write request sent by a host, wherein the data write request comprises new service data and an ID of the mirrored LUN;

forward the data write request to the primary storage device; and write the new service data to the mirrored LUN in response to receiving a message indicating that the primary storage device has written the new service data to the primary LUN.

* * * * *